United States Patent [19]
Wu et al.

[11] Patent Number: 5,922,161
[45] Date of Patent: Jul. 13, 1999

[54] SURFACE TREATMENT OF POLYMERS

[75] Inventors: Dong Yang Wu; Sheng Li, both of Wheelers Hill; Gutowski Wojciech Stanislaw, Frankston, all of Australia

[73] Assignee: Commonwealth Scientific and Industrial Research Organisation, Australian Capital Territory, Australia

[21] Appl. No.: 08/894,054

[22] PCT Filed: Jun. 28, 1996

[86] PCT No.: PCT/AU96/00407

§ 371 Date: Aug. 8, 1997

§ 102(e) Date: Aug. 8, 1997

[87] PCT Pub. No.: WO97/02310

PCT Pub. Date: Jan. 23, 1997

[30] Foreign Application Priority Data

Jun. 30, 1995 [AU] Australia ................................. PN3886
Nov. 15, 1995 [AU] Australia ................................. PN6554

[51] Int. Cl.[6] ..................................................... B32B 31/00
[52] U.S. Cl. .................................... 156/272.6; 156/275.5; 156/275.7; 427/2.11; 427/223; 427/261; 427/322; 427/383.1; 427/393.5; 427/536
[58] Field of Search .............................. 156/272.6, 275.5, 156/275.7; 427/223, 536, 261, 2.11, 322, 383, 393.5

[56] References Cited

U.S. PATENT DOCUMENTS

| | | | |
|---|---|---|---|
| 3,286,009 | 11/1966 | Yumoto et al. . | |
| 3,317,339 | 5/1967 | Fortner et al. ............................ | 117/47 |
| 3,418,066 | 12/1968 | Caldwell et al. . | |
| 3,582,333 | 6/1971 | Yost et al. ................................... | 96/74 |
| 4,197,129 | 4/1980 | Muroi et al. ........................ | 427/223 X |
| 4,421,780 | 12/1983 | Buzio et al. . | |
| 5,312,108 | 5/1994 | Hayashi . | |
| 5,484,560 | 1/1996 | Moriyama et al. .................. | 422/536 X |
| 5,684,065 | 11/1997 | Hiruoka et al. ....................... | 522/78 X |
| 5,702,772 | 12/1997 | Skelly et al. ............................. | 427/536 |

FOREIGN PATENT DOCUMENTS

| | | |
|---|---|---|
| 29803/84 | 3/1985 | Australia . |
| 0 311 989 | 4/1989 | European Pat. Off. . |
| 2664-282 | 1/1992 | France . |
| 3 619 694 | 12/1987 | Germany . |
| Sho 56-16175 | 4/1981 | Japan . |
| Sho 58-132029 | 8/1983 | Japan . |
| 61-81437 | 4/1986 | Japan . |
| 62-10181 | 1/1987 | Japan . |
| Sho 64-80099 | 3/1989 | Japan . |
| 02-298521 | 12/1990 | Japan . |
| 06-340754 | 12/1994 | Japan . |
| WO 89/09795 | 10/1989 | WIPO . |
| WO 91/15952 | 10/1991 | WIPO . |
| WO 92/10366 | 6/1992 | WIPO . |
| WO 95/20006 | 7/1995 | WIPO . |
| WO 95/21212 | 8/1995 | WIPO . |

OTHER PUBLICATIONS

Database WPI, Week 8119, Derwent Publications Ltd., AN 81–33713D (no date avail).

Gutowski, W.S. and Pankevicius, E.R., "A novel surface treatment process for enhanced adhesion of ultra–high modulus polyethylene fibres to epoxy resins", *Composite Interfaces* 1(2):141–151 (1993).

Gutowski, W.S. et al., "Surface silanization of polyethylene for enhanced adhesion", *J. Adhesion* 43:139–155 (1993).

*Primary Examiner*—Michael Lusignan
*Attorney, Agent, or Firm*—Pillsbury Madison & Sutro LLP

[57] ABSTRACT

This invention relates to a method of modifying or tailoring the surface of polymers and or polymer-based materials to control surface and interface chemistry and molecular structure. In particular a method of modifying at least a part of the surface of a polymer including: (i) oxidising at least part of the surface of the polymer and (ii) treating the oxidised surface with at least one multifunctional amine-containing organic compound to bind said compound to the oxidised polymer surface.

25 Claims, No Drawings

SURFACE TREATMENT OF POLYMERS

This application is the national phase of international application PCT/AU96/00407, filed Jun. 28, 1996 which was designated the U.S.

FIELD OF THE INVENTION

This invention relates to a method of modifying or tailoring the surface of polymers and/or polymer-based materials to control surface and interface chemistry and molecular structure.

BACKGROUND OF THE INVENTION

Polymeric or polymer based surfaces are often difficult to wet and bond because of low surface energy, incompatibility, chemical inertness, or the presence of contaminants and weak boundary layers. The lack of adequate adhesion at the substrate/adherent and/or reinforcement/matrix interfaces often results in poor material performance and limits the possible applications of the polymeric materials. Effective surface treatments are frequently required to overcome one or more of the abovementioned difficulties in order to achieve controlled or maximised composite performance and controlled level of adhesion with adhesives, coatings, etc.

In practical applications, solid polymeric material surfaces may also be required to exhibit a specific level or gradient of wettability by organic and/or inorganic liquids or vapours of these liquids. Depending on specific end-applications, the liquid phase or condensate may require to form a uniform film on the wettable solid's surface, or alternatively it may be required to bead-up on an unwettable liquid-repellent surface. With regard to the wetting capability by water-based media, the former material is defined as hydrophilic, and the later as hydrophobic. It is also possible that in some instances, an intermediate level of wettability is desirable.

Another important area of application of polymeric materials is in the biomedical field. To design a useful biomedical material, it is important to consider both bulk and surface properties of the material. Historically, selection of a biomedical material for a particular application has been based upon bulk property specifications. However, there is increasing recognition that a biomedical material must exhibit a specific surface chemical behaviour in order to minimise interfacial problems with host tissues and fluids. Thus, it is often required that the surface of biopolymer be chemically modified so that surface and interface behaviour could be controlled.

Various surface treatment processes have been developed to achieve different specific requirements. These include chemical oxidation with the use of oxidising agents; surface chemical grafting and various physical-chemical methods such as corona discharge; flame treatment; plasma treatment; and UV irradiation. Simple oxidative treatments by flame treatment, corona discharge, or chemical oxidation generally lead to a noticeable increase in surface hydrophilicity, and bonding ability as a result of the occurrence of oxygenated groups such as carboxyl, hydroxyl and carbonyl on the modified polymer surfaces. Such modified surface is, however, not stable and the chemistry and/or increased hydrophilicity is not permanent. This may be due to the partial removal low molecular weight oxidised material by a polar solvent or water from the oxidised surface. Alternatively, or in addition, it may be due to the reorientation of the surface functional groups which rotate inwardly into the bulk of the polymer during the storage or the use of such treated materials. Plasma treatment and/or plasma polymerisation is known to significantly improve bonding ability of the treated polymers or to achieve desired level of wettability as a result of selective incorporation of different types of chemical species onto the polymer surface through the use of an appropriate treatment gas or a monomer under controlled process conditions. Similarly to the oxidised surface, however, the plasma treated polymer surface is not stable in storage because of rotation and migration of the generated surface functional groups into the bulk of the material and the occurrence of post-chemical reactions within the modified surfaces. An additional drawback with plasma treatment or plasma polymerisation resides in the expensive process apparatus required and the high cost associated with the on-going operations and the difficulties experienced in carrying out the surface treatment continuously.

International Patent Application No. PCT SE89-00187 discloses a method of increasing the hydrophilicity of the polymer surface by a 3-steps process comprising: (1): producing carboxyl, carbonyl and hydroxyl groups on the polymer surface by an oxidation treatment process such as etching with oxidising acid solutions, corona discharge, flame and plasma treatment; (2) reacting the groups on the oxidised polymer surface with a compound belonging to the following groups A and B, wherein group A includes heterocyclic compounds having three or four ring atoms, such as oxiranes, thiiranes, aziridines, azetidinones, oxetanes, and group B includes carbodiimides (R—N=C=N—R') and isocyanates (R—N=C=O, or N=C=O—R—O=C=N). The reaction according to step (2) has to be carried out in aprotic organic solvents, such as ketones and ethers due to the fact that the compounds in groups A and B are not stable in aqueous solution, and (3) post-treating the polymer material previously treated according to step (2) with further application of compounds containing nucleophilic groups, such as alcohols, water, amines, carboxylic acids and hydroxycarboxylic acids which react with the modified surface either by opening aziridine rings, or react with the residual isocyanate groups.

Japanese Patent Publication No. Sho 56-16175 teaches that the poor bonding between an oxidised polyolefin and resorcinol or epoxy adhesive is due to the inability of the adhesive resin molecules to microscopically approach polar groups at an oxidised polymer surface. The method proposed to alleviate this problem involves treating the oxidised surface with a low viscosity solution of a low molecular weight compound whose chemical constituents are the same as or similar to those used for the cure of the two-component epoxy or resorcinol adhesives. These, in turn, affiliate with the polar groups of the oxidised polymer and subsequently act as a setting agent for the adhesive resin. The process described in the document is stated to be effective when the setting agent is not of the oxidative type. In the step of treating the oxidised surface of the polyolefin a 1 to 5% aqueous solution of a low molecular weight amine is applied which is dried on the surface and the surface is subsequently bonded using resorcinol or epoxy adhesive at about 80° C. We have found that the amines, when applied by this method, act as a weak boundary layer having an adverse effect on adhesion.

It is an objective of the present invention to alleviate or overcome one or more difficulties related to the prior art. We have found that oxidation of the polymer surface and reaction of the oxidised surface with a multi-functional amine containing compound allows the surface to be permanently modified with selected inorganic and/or organic functional groups and molecular structures for specific purposes, such as adhesive bonding, coating, changing or controlling wettability, biocompatibility, and improving composite performance, etc.

The present invention provides a method of modifying at least part of the surface of a polymer including:

(i) oxidising the surface of a polymer substrate by any suitable oxidising means such as corona discharge, flame treatment, chemical oxidation, photo-chemical oxidation and non-depositing plasma treatments;

(ii) exposing the oxidised polymer surface to at least one multi-functional amine containing organic compound and bonding the said multi-functional amine containing organic compound to the oxidised surface. When the multifunctional amine-containing organic compound is applied in a solution of concentration 0.5% by weight or more, the treated polymer surface is washed to remove excessive multi-functional amine containing organic compound. Preferably the surface is washed even when concentrates of less than 0.5% are used.

It is preferred that a single multi-functional amine containing compound be used however a mixture of two or more such compounds may be used if desired. The multifunctional amine containing compound may be used neat but is preferably used as solution of preferably 0.000001% to 10% by weight, or more preferably the concentration is less than 1% by weight (most preferably 0.01 to 1%).

In another preferred embodiment, the method of invention includes grafting a compound containing acidic group(s) onto the polymer surface through reaction with the multi-functional amine containing organic compound. The specific procedure used in this embodiment of the invention may include oxidation and reacting the oxidised polymer surface with the multi-functional amine containing compound in the presence of the compound containing acidic group(s) or alternatively reaction with the compound containing acidic group(s) can be carried out after the reaction between the oxidised polymer surface and the multi-functional amine containing compound has be completed. In this embodiment the amine/acidic group ratio used is greater than 1. This embodiment provides a modified polymer surface with a grafted double-layer molecular structure and a specific surface chemistry. A multi-layer may be obtained by repeating the above mentioned chemical treatment procedures to satisfy specific physical-chemical, rheological, and/or biocompatible requirements.

By the term "polymer", as used herein, we mean homopolymers, co-polymers and/or their blends and alloys with other polymers and/or natural and synthetic rubbers, and polymer matrix composites, on their own, or alternatively as an integral and uppermost part of a multi-layer laminated sandwich comprising any materials e.g. polymers, metals or ceramics, or an organic coating on any type of substrate material. The term "polymer" means also a thermoset and/or a thermoplastic material.

The polymeric materials which can be surface modified by applying the present invention include, but not limited to, polyolefins such as low density polyethylene (LDPE), polypropylene (PP), high density polyethylene (HDPE), ultra high molecular weight polyethylene (UHMWPE), blends of polyolefins with other polymers or rubbers; polyethers, such as polyoxymethylene (Acetal); polyamides, such as poly(hexamethylene adipamide) (Nylon 66); halogenated polymers, such as polyvinylidenefluoride (PVDF), polytetra-fluoroethylene (PTFE), fluorinated ethylene-propylene copolymer (FEP), and polyvinyl chloride (PVC); aromatic polymers, such as polystyrene (PS); ketone polymers such as polyetheretherketone (PEEK); methacrylate polymers, such as polymethylmethacrylate (PMMA); polyesters, such as polyethylene terephthalate (PET); and copolymers, such as ABS, ethylene propylene diene mixture (EPDM). The polymer materials to be treated may be in the forms of flat sheets, films, complex shaped articles, particulate or powders, woven fabrics, and/or individual fibres. These can be solid polymeric mono-materials, laminated products or hybrid materials, or alternatively organic coatings on any type of the base substrate which can be non-metallic or metallic in nature.

Any suitable method may be used to oxidise at least part of the surface of the polymeric material. Such techniques include, but not limited to, corona discharge, flame treatment, non-depositing plasma treatment, chemical oxidation, UV irradiation and/or excimer laser treatment in the presence of an oxidising atmosphere such as, but not limited to: air, oxygen ($O_2$), ozone ($O_3$), carbon dioxide ($CO_2$), Helium (He), Argon (Ar), and/or mixtures of these gases. However, for the present method the technique of an electrical discharge for instance corona discharge, flame treatment and/or chromic acid treatment are preferred.

Suitable corona discharge energies range from 0.1–5000 $mJ/mm^2$ but more preferably 10–80 $mJ/mm^2$. Corona discharge treatment may be carried out in the presence of the following atmospheres: air, oxygen ($O_2$), ozone ($O_3$), carbon dioxide ($CO_2$), Helium (He), Argon (Ar), and/or mixtures of these gases. Suitable treatment times and discharge energies can be calculated using the following equations:

$$t = d/v_1 (\text{or } v_2)$$

where $E = Pn/lv_1$ or $E = Pn/lv_2$ t=treatment time for a single pass of treatment under the electrode d=electrode diameter E=discharge energy P=power energy n=number of cycles of treated substrate moving under the electrode l=length of treating electrode $v_1$=speed of treating table $v_2$=speed of conveyor tape (i.e. continuous treatment)

When non-depositing plasma glow discharge treatment is used, the range of suitable energy is 5–5000 Watts for 0.1 seconds to 30 minutes, but more preferably 20–60 Watts for 1 to 60 seconds.

Alternatively, any known flame treatment may be used to initially oxidise at least part of the surface of the polymer or polymer based material. The range of suitable parameters for the flame treatment are as follows: the oxygen ratio (%) detectable after combustion from 0.5% to 5%, preferably from 0.8% to 2%; conveyor speed from 1 m/min to 800 m/min, preferably from 10 m/min to 100 m/min; treatment distance from 2 mm to 500 mm, preferably from 5 mm to 100 mm. Many gases are suitable for flame treatment. These include, but are not limited to: natural gases, pure combustible gases such as methane, ethane, propane, hydrogen, etc or a mixture of different combustible gases. The combustion mixture also includes air, any pure oxygen or oxygen containing gases.

Similarly, chemical oxidation of at least part of a polymer surface can be effected with any known, standard etching solutions, such as chromic acid, potassium chlorate-sulfuric acid mixtures, chlorate-perchloric acid mixtures, potassium permanganate-sulfuric acid mixtures, nitric acid, sulfuric acid, peroxodisulphate solution in water, chromium trioxide, or a dichromate solution in water, chromium trioxide dissolved in phosphoric acid and aqueous sulphuric acid, etc. More preferably, chromic acid treatment is used. The time taken to complete the treating process can vary between 5 seconds to 3 hours and the process temperature may vary from room temperature to 100° C.

The current invention involves treatment of the surface of a polymeric substrate with a multi-functional amine containing organic compound. The multifunctional amine containing organic compound is a carbon, hydrogen and nitrogen containing compound which either has at least two amine groups or has one or more amine group(s) and at least one functional group other than the amine functional group (s). The compound may also contain one or more of the elements such as oxygen, sulphur, halogen and phosphorous in addition to carbon, hydrogen and nitrogen but generally will not contain silicon, titanium, zirconium or aluminium which are the basis of conventional coupling agents. Examples of multi-functional amine containing compounds having at least one amino group include compounds of groups A and B, wherein group A includes low and/or high molecular weight organic amines, that is compounds containing two or more amine functional groups. The amines can be primary, secondary, and/or tertiary amines, or a mixture of these three types of amines, however, primary and secondary amines are preferred due to their higher chemical reactivities in, comparison with the tertiary amines. Group B chemicals include multi-functional organic compounds in which at least one amine functional group and one or more non-amine functional groups are presented. The non-amine functional groups include, but are not limited to, the following functional groups and their mixtures: perfluorohydrocarbons, unsaturated hydrocarbons, hydroxyls/phenols, carboxyls, amides, ethers, aldehydes/ketones, nitriles, nitros, thiols, phosphoric acids, sulfonic acids, halogens. More specifically, the groups include, but are not limited to, any of the following chemical moieties:

AI: linear and carbon cyclic based multi-functional amine (at least diamine) compounds containing 2 to 60 carbon atoms, preferably 2 to 36 carbon atoms eg. diamino propane, diamino butane, diamino pentane, diamino hexane, diamino octane, diamino decane, diamino nonane, dimino dodecane, hexamethylene diamine, pentaethylene hexamine, triamino pyrimidine, 1,2-diaminocyclohexane, etc.

AII: polymer containing a multiplicity of amine functional groups such as polyamine compounds with molecular weight ranging from a few hundreds to a few millions eg. polyethylene imine, polyallylamine, polyvinylamine, etc.

BI: Perfluoroamines: e.g. perfluoroethylamine, perfluorotributylamine, etc

BII: Amino alcohols/phenols: e.g. 2-amino ethanol, 6-amino-1-hexanol, 2-amino-2-methyl-propanol, 2-amino-2-ethyl-1,3-propanol, 4-aminophenol, etc;

BIII: Amino polysaccharides: amino dextran, etc.

BIV: Amino acids: e.g. 4-amino butyric acid, amino undecanoic acid, diamino butylic acid, 5-amino salicylic acid, etc:

BV: Amino aldehydes/ketone: amino acetaldehyde ($H_2NCH_2CHO$), 1.3, diamino acetone, etc;

BVI: Amino amides: amino acetamide ($H_2NCH_2CONH_2$), poly(acrylic 6-acid 6-aminohexyl amide), amino butene thioamide, etc:

BVII: Amino ethers: eg. 3-aminopropyl-n-butylether, 3-amino-1-propanol-vinylether, etc;

BVIII: Amino esters: e. g. ethyl4-aminobutyrate, etc;

BVIIII: Amino nitrites: e. g. β-aminopropionitrile, methoxylaminoacetonitrile, diamino maleonitrile, etc;

BX: Amino nitros: e. g. amino nitropyridine, etc;

BXI: Amino thiols: e. g. 1-amino-2-methyl-2-propanethiol, etc; butylaminoethanethiol, etc;

BXII: Amino phosphoric acids: amino propyl phosphoric acid, amino phosphonobutyric acid, aminobenzyl phosphoric acid, etc;

BXIII: Amino sulfonic acids: 3-amino-i-propane sulfonic acid, amino benzene sulfonic acid, etc;

BXIV: Amino halogens: amino chlorobenzyl alcohol, etc;

BXV: Amino alkenes, amino alkynes: allyamine, diallyamine, triallyamine, etc.

All the compounds in class B (BI to BXV) may contain from 2 to 60 carbon atoms, preferably, from 2 to 36 carbon atoms in the case of low molecular weight compounds, and in the case where a polymeric compound is involved, the molecular weight of the compound may range from a few hundreds to a few millions.

The acidic group containing compound as used in the present invention in conjunction the multi-functional amine containing compound for achieving double or multi-layer surface grafting as specified previously in one of the preferred embodiment of the invention include compounds having at least one of the following acidic group or their hydrolysable salts such as, but not limited to, carboxylic/carboxylate, sulfonic/sulfonate and phosphoric/phosphonate groups. The compounds may also contain more than one type of acidic groups as well as other organic functional groups such as hydroxyl, amine, amide, ether, ester, ketone, aldehyde, halogen, etc, in their molecular structures. The acidic groups containing compounds can be small molecules with 2 to 60 carbon atoms, or macromolecules with molecular weight ranged from a few hundreds to a few millions. It is preferred that more than one acidic group be included in the molecular structure of the acidic groups containing compounds.

Preferably the acid group containing compound is selected from the group consisting of: polymers of monomers selected from the group consisting of acrylic acid, methacrylic acid, p-styrene carboxylic acid, 4-methacryloyloxyethyl trimellitate, vinyl sulphonic acid, p-styrene sulfonic acid, melaphosphonic acid; and copolymers including one or more thereof; and polysaccharide derivatives containing sulfonic/sulphonate and carboxylic/carboxylate groups.

Examples of the acidic groups containing compounds are as follows: carboxylic acid containing compounds (e.g. polyacrylic acid, polysaccharide derivatives containing carboxyl or carboxylate groups, polymethacrylic acid, poly(acrylic acid-co-maleic acid), poly(p-styrene carboxylic acid), poly(4-methacryloyloxyethyl trimellitate)); sulfonic acid containing compounds (e.g. polysaccharide derivatives containing sulfonic acid or sulfonate groups, poly(vinylsulfonic acid), poly(p-styrenesulfonic acid)); and/or phosphoric/phosphonic acid containing compounds (poly(metaphosphoric acid)). The concentration of the solution containing compounds having acidic groups is preferably 0.000001% to 10% by weight, or more preferably when it is 0.01% to less than 1% by weight. When the concentration is 0.5% by weight or more, said unreacted or excessive composition is washed from the treated polymer substrate prior to drying and further end-applications.

Both groups i.e. A and B of the multi-functional organic amine containing compounds and the acidic groups containing compounds may be applied from solution (dip, brush, spray), vapour or any type of mechanical dispersion of a pure chemical or their solutions and/or mixtures in any suitable solvent. According to the invention, any aqueous and/or organic solvent or a mixture of both may be used to prepare the reactive solutions so long as it does not attack the substrate and permits sufficient dissolution of the amine containing compounds claimed in this invention. Preferred solvents used for preparing the solution are water, and alcohols (ie. isopropyl alcohol, and ethanol).

We have found that the concentration of the multi-functional amine containing compound at the surface of the polymer substrate has a significant effect on the bond strength of the subsequently applied adhesive or coating. It might be expected that a higher concentration would provide a greater number of binding sites and hence greater strength as believed in the prior art. The reality is that the reverse is the case in many circumstances. Our experience as outlined in the examples of this patent clearly shows that the application of the grafting chemicals at a concentration of 1% by weight or more onto polymer surfaces without subsequent rinsing results in the formation of a weak boundary layer on the treated polymer surface due to the presence of loosely attached excessive molecules which are not chemically grafted onto the polymer surface. This consequently leads to the observed reduction of the bond strength and subsequent premature product failure upon exposure for instance to a humid atmosphere or immersion in a liquid such as water or other type of liquid. Accordingly it is preferred in our invention that the multi-functional organic amine containing compound is either (a) applied at a concentration in the range of from 0.000001% to less than 1% by weight preferably no more than 0.5% by weight (most preferably no more than 0.25%) or (b) that the multi-functional organic compound is allowed to react at the surface of the polymeric substrate and the excess is then removed by washing the surface of the polymeric substrate with water or a suitable solvent or a combination of both using either a single step or a multi-steps rinsing procedure. Most preferably both steps (a) and (b) are used, that is a dilute solution is used for the application of the multi-functional amine containing compound and the treated substrate is rinsed prior to drying and the subsequent end-applications.

The amine containing compound may be applied for any suitable time period from 0.0001 seconds to 24 hours at any suitable temperature from room temperature up to, and above the boiling point of these compounds. Preferably, the compounds are applied for 0.01 to 30 seconds at 20 to 100° C.

For a given application, one or more multi-functional organic amine containing compound may be chosen in which the functional groups grafted onto the polymer surface have controlled or maximised reactivity at the interface. For example, if the substrate to be modified is to be bonded to a cyanoacrylate adhesive, a multi-functional organic amine would be selected in order to equip the polymer surface with the nucleophilic free amine groups which then initiate the cure and react with the adhesive during bonding and curing of the adhesive. XPS (X-ray Photoelectron Spectroscopy) analysis on HDPE treated by corona discharge oxidation followed by application of a multi-functional amine confirms that the amine compound was irreversibly grafted onto the oxidised polymer surface, and that 60% of the amine groups on the surface remain free for participating in further reaction(s).

It was also found that it is advantageous if during the treatment of the polymeric substrate with the multi-functional organic amine containing compound a suitable static and/or high frequency alternating physical field is simultaneously applied to the organic amine containing compound and/or to the substrate. For example, any one of the following fields may be used: ultrasonic, microwave, radio-frequency, heat energy or a combination thereof. Preferably an ultrasonic field and/or microwave is used.

According to the invention, optional organic functional groups become attached to a polymeric substrate surface by dipping the oxidised substrate into a composition containing the amine(s) with the simultaneous application of ultrasonic energy to the solution. The advantages provided by simultaneous application of ultrasonic field and/or microwave during the step (ii) of the treatment is to accelerate and promote the attachment of the selected chemical compound onto the polymer surface in order to obtain a modified surface with stabilised and improved physical and chemical properties. Further, the simultaneous application of an ultrasonic energy during the treatment is also possible to improve the orientation of the adsorbed molecules.

The preferred frequency range of ultrasonic energy field ranges between 1 to 500 kHz, more preferably between 10 to 50 kHz.

Preferably when used microwave energy is applied in the range of from 1 GHz to 300 GHz.

The present invention generally may be used to: 1) control or enhance the bonding ability of the polymeric materials to other materials including, but not limited to adhesives, sealants, coatings and any other reactive and/or non-reactive organic, inorganic or metallic materials, or mixtures thereof; 2) control surface energies and/or wettability therewith render hydrophobic polymeric materials hydrophilic or vice-versa; (3) improve composite performance through the surfaces of the polymer or polymer-based reinforcing materials being chemically modified according to the present invention in order to achieve controlled or maximised adhesion and rheological properties at the reinforcement (fibre or filler)/matrix interfaces; (4) improve biocompatibility of polymeric materials for various bio-medically related applications.

Following the treatment of a polymer or polymer-based material by the method of the invention the treated surface may be adhesively bonded to another substrate or coated.

When adhesively bonded to another substrate any suitable adhesive may be applied to the treated surface and then the other substrate is brought into contact with the adhesive. Suitable adhesives include, for example, cyanoacrylates, structural acrylic adhesives, polyurethane adhesives, silicone adhesives, sealants, unsaturated polyester adhesives, contact adhesives, or thermoplastic adhesives. Examples of particular suitable adhesives include, but are not limited to Cyanoacrylates Loctite 406, Loctite 454, acrylic Permabond F241, polyurethane Tyrite 7520 A/B. Preferably the adhesive will be cured at a temperature lower than 70° C.

Alternatively, any suitable contact adhesive such as, but not limited to, self adhesive tape may be applied to the treated surface and then the other substrate may be brought into contact with the tape.

Preferably the method of the invention involves application of a coating composition to the treated polymeric substrate. The coating composition may be a metallic or a solid based paint, lacquer, varnish, enamel, water-emulsion, non-aqueous dispersion (organosol), plastisol or powder coating, radiation curable coating, sputter coating or the like.

When the treated substrate is printed with an ink, any suitable ink may be used.

Similarly, when the treated substrate is coated with a metallic material, any suitable metallic material may be used. Also, any coatings, based on aqueous and/or organic carrier and containing magnetic particles such as used in voice and/or image recording may be applied onto the substrate treated in accordance wish our invention.

The examples, by no means exhaustive, of technologically/biologically important areas that the polymer surfaces modified by the present method of invention can be applied to achieve controlled level of hydrophilicity or hydrophobicity are as follows:

Controlled evaporation/heat transfer:

Controlled/optimised solid's wettability provides the means for an increase or decrease of cooling liquid's evaporation rate, resulting in an optimised heat transfer through the heat exchanger's surface;

Printing:

Controlled/increased wettability of printing inks, coatings and other fluids on papers, polymers or metals, and controlled spreading of the printing substance on transfer platens and/or rolls;

Release coatings:

Controlled/minimised adhesion of any required substance (eg. water, oil, adhesive, paint, blood cells) on the release/anti-stick material surface;

Textiles:

Controlled/maximised spreading rate of fibre finishes, dyes, inks etc, or alternatively water, oil or soil/dirt repellency;

Decorative coatings:

Controlled/maximised spreading rate and adhesion of organic/inorganic/metallic or hybrid coatings applied onto the solid material's surface;

Surface cleanliness, colour uniformness and/or self-cleaning capability/enhancement:

Controlled/maximised spreading rate of liquids or vapours and/or good liquid film retention capability on the product surface finish.

The invention allows the wettability of polymer surfaces to be controlled by using an appropriate multifunctional amine-containing organic compound and optionally also the acid group containing compound. For example (i) when the untreated polymeric surface is hydrophobic providing a wettable surface and a water contact angle equal or less than 60°; and (ii) when the untreated polymer surface is hydrophilic providing a non-wettable surface of water contact angle equal or greater than 90°.

This invention is particularly useful in modifying the hydrophilicity of polymer coated metal products. Hydrophobic polymers are commonly used as surface coatings to protect metal surfaces from tarnishing or corroding and for providing an attractive finish. Such coated metal products are widely used in the building and automotive industries. The hydrophobic nature of the polymer is particularly useful in these applications as it provides an effective moisture barrier. Notwithstanding this advantage, however, hydrophobicity of the surface detracts from the asthetics of the surface coating. When placed on the hydrophobic surface water forms beads which dry to form unsightly marks. The effect of the dried water beads is particularly detrimental in the presence of dust, dirt or salts.

The present invention allows the hydrophobic polymer to be applied as a coating to the metal to thereby provide the advantageous moisture barrier and the surface to be subsequently modified to improve its aesthetics without detracting from the protective function of the polymer coating. The invention also has the advantage that it allows the aesthetics of the surface to be improved without the need to change the current coating processes of the polymer or metal substrate used. The improvement in appearance is effected by treating the coated metal product by the means of the present invention.

In this embodiment of the invention the coating may be polyester, polyvinylidiene fluoride or any other polymer referred to above and the metal may be steel, aluminium or other metal or alloy. The well known COLOURBOND (trade mark John Lysaght Australia Pty. Ltd) products may be treated according to the process of this invention.

It is generally established that the contact angle of water on a wettable polymer surface should be lower than 60° and preferably is below 45° C. This is not easy to achieve on a number of substrate surfaces with conventional surface oxidation methods such as corona discharge, flame treatment and even non-depositing plasma treatments. Also the hydrophilicity created by these methods is not stable with time as mentioned earlier.

Therefore, the combination of a simple oxidation method and post-chemical grafting either by a 2-steps or a 3-steps process as specified in the present invention will provide suitable, stable and low cost hydrophilic surfaces to meet variable requirements, Subsequent to the treatment of a polymer or polymer-based material by the method of the current invention the treated surface may be used for the various biomedical applications. Medical products made by use of modified polymeric materials include, but not limited to, the following applications:

Medical treatment

Blood purification systems; Blood oxygenator for artificial lung, hemodialyzer and hemofilter for artificial kidney, filters for plasmapheresis or virus removal, adsorption column for detoxification, cell separator, immunoactivator;

Prosthesis: blood access, vascular prosthesis, patch grafting, artificial cornea, artificial heart valve, blood pump for heart assist, contact lens, intraocular lens, bypass tube, catheter of hyperalimentation, hydrocephalus shunt, implants in plastic surgery, prosthesis and implants in dental surgery, wound dressing or covering;

Disposable articles: Catheters, tubing, haemostatics, adhesives, syringe, suture Drug delivery systems:

Transmucosa systems for glaucoma or contraceptive; transdermal systems for nausea, stenocardic, hypertension etc; polymer conjugate for antimalignancy; lipid microspheres for circular disorder and infectious disease; microcapsules and lipid microspheres in targeting Clinical laboratory tests:

Dry reagent chemistry, immobilization of proteins, immobilized enzyme for biosensor, microspheres in immunoassay and measurement of biological activity of cells, nucleic acid hybridization assay, non-fouling surfaces and anti-bacteria attachment.

The invention will now be described in greater detail in conjunction with specific examples. It will be appreciated that the examples are provided for the purposes of illustrating the invention and that they in no way should be seen as limiting the scope of the above description.

In the examples, the surface of a range of substrates is treated by various methods and submitted to different end-applications.

After adhesive bonding, the specimens were allowed to cure for 72 hours prior to mechanical testing using single lap-shear test with an overlap of 3 mm. The test is carried out on an Instron mechanical tester at room temperature and at a cross-head speed of 10 mm/min.

In the case of coated specimens, an aluminium dolly is adhesively bonded to the cured coating film, and is subsequently pulled out under tensile stress in order to determine the strength of adhesion between the coating and the substrate.

The air/water contact angle measurements are chosen to provide an indication of the hydrophilicity of polymer surfaces before and after surface modifications. The contact angle measurements were carried out in ambient condition (20±2° C., relative humidity=50±5%) using a Rame-Hart contact angle goniometer model 100-00. The air/water contact angle reading was taken immediately after the deposition of the droplet on the surface.

In the case of wettability measurements, experiments were carried out by counting the time required for a continuous water film to dry out from a polymer surface in the air. Each measurement was repeated three times consecutively. Bearing in mind that it is difficult to obtain absolute values from this type of measurements, it is probably more appropriate to classify the results in terms of "Good", "Moderate", "Poor", and "Very poor". "Good" means the formation of a complete water film on the polymer surface and a slow evaporation of water from such surface. More specifically, the estimated time during which the water film breaks on the edge of the specimen should be more than 15 to 30 seconds and the time required for drying out water from the centre of the specimen is more than 2 minutes. "Moderate" indicates that the water film breaks quickly on the edge of the specimen and that the drying time of water from the surface will be between 0.5 to 2 minutes. When a continuous water film can still be formed on the surface but it breaks quickly, then the surface is characterised as having "Poor" surface wettability. Finally, a surface failing to be covered by a continuous water film is identified as having "Very poor" surface wettability.

EXAMPLE 1

In this example the surface of samples of polypropylene (PP), high density polyethylene (HDPE) and low density polyethylene (LDPE) were treated by various methods and were bonded with an epoxy adhesive (LC191), a cyanoacrylate adhesive (Loctite 406) and a polyurethane adhesive (Tyrite 7520 A/B).

The various surface treatments were:
(i) no treatment
(ii) first treated by air corona discharge at a level of 151 mJ/mm$^2$ and then dipped in 1% or 5% of polyethyleneimine or triethylenetetramine in isopropanol in order to explicitly illustrate the disadvantages of the invention described in Japanese Specification No. Sho 56-16175 and to explain significant advantage of the novel process described in this invention. The treated samples were either directly subjected to bonding with the epoxy adhesive (LC191) or the cyanoacrylate adhesive (Loctite 406) or subjected to rinsing of the treated surfaces in accordance with our invention by distilled water and ethanol to eliminate the excessive or non-reacted chemicals followed by drying the surface prior to the application of the same type of adhesives.

After curing of the adhesive, the strength of the bond was tested to compare the relative results of different surface treatments. The results of the tests are recorded in Table 1 and 2.

TABLE 1

Lap shear strength (MPa) of untreated LDPE, HDPE, PP bonded to polyurethane, epoxy and cyanoacrylate adhesives

| Adhesive | Polymer | Lap shear strength (MPa) |
|---|---|---|
| Polyurethane | LDPE | 0.7 |
| (Tyrite 7520-A/B) | HDPE | 1.1 |
|  | PP | 0.6 |
| Epoxy | LDPE | 0.3 |
| (LC191) | HDPE | 1.3 |
|  | PP | 0.5 |
| Cyanoacrylate | LDPE | 0.1 |
| (Loctite 406) | HDPE | 0.3 |
|  | PP | 0.1 |

TABLE 2

Lap shear strength (MPa) of HDPE and PP treated with 1% or 5% polyethyleneimine or triethylenetetramine with or without subsequent rinse, then bonded with an epoxy (LC191) or a cyanoacrylate (Loctite 406) adhesive

| | | Lap shear strength (MPa) | | | |
|---|---|---|---|---|---|
| Treatment condition | Treatment method | HDPE/LC191 | PP/LC191 | HDPE/L406 | PP/L406 |
| Corona + 1% Triethylene-tetramine | dip, no rinse | 4.5 | 4.0 | 2.6 | — |
| | dip, rinse | 9.5 | 8.3 | 13.6 | — |
| Corona + 5% Triethylene-tetramine | dip, no rinse | 5.5 | 5.6 | 0.9 | — |
| | dip, rinse | 12.5 | 11.5 | 14.7 | — |
| Corona + 1% Polyethylen-imine | dip, no rinse | — | — | 6.8 | 5.4 |
| | dip, rinse | — | — | 16.5 | 13.7 |
| Corona + 5% Polyethylen-imine | dip, no rinse | — | — | 3.7 | 2.6 |
| | dip rinse | — | — | 15.4 | 12.1 |

As can be seen from the Table 1 untreated LDPE, HDPE and PP have very poor adhesion to all adhesives used. The results in Table 2 clearly show that when the amine compounds were applied at 1% or 5% to the polymer surfaces oxidised by corona discharge, it is imperative to remove excessive non-reacted chemicals from the treated surfaces by rinsing with an appropriate solvent or solvents as described in our invention. Otherwise, these non-reacted chemicals can act as a weak boundary layer, resulting in significant reduction of the effect of the treatment on the enhancement of adhesion.

EXAMPLE 2

In this example, the surface of samples of high density polyethylene (HDPE) and polypropylene (PP) were treated by various methods as shown in Table 3 and were then bonded with a cyanoacrylate adhesive (Loctite 406).

In all the treatments the samples were treated with air corona discharge at a level of 755 mJ/mm$^2$. The corona treated samples were then either not treated any further prior to applying the adhesive or dipped in a solution of very low concentration of polyethyleneimine or triethylenetetramine for 30 seconds or dipped in the same types of solutions whilst simultaneously applying ultrasonic energy to the solution at 35 kHz for 30 seconds.

Isopropanol was used as the solvent for both polyethyleneimine and triethylenetetramine solutions.

TABLE 3

Lap shear strength (MPa) of HDPE and PP following treatment with various concentrations of polyethyleneimine and bonded with a cyanoacrylate adhesive (Loctite 406)

| Polymer | Corona only 755 (mJ/mm$^2$) | Corona + 0.01% Polyethylene- imine Dip | Corona + 0.01% Polyethylene- imine u/s* | Corona + 0.0005% Polyethylene- imine Dip | Corona + 0.0005% Polyethylene- imine u/s* | Corona + 0.00001% Polyethylene- imine Dip | Corona + 0.00001% Polyethylene- imine u/s* | Corona + 0.000001% Polethylene- imine Dip | Corona + 0.000001% Polethylene- imine u/s* |
|---|---|---|---|---|---|---|---|---|---|
| HDPE | 1.5 | 14.8 | 16.6 | 10.1 | 16.7 | 10.6 | 14.3 | 7.2 | 14.7 |
| PP | 0 | 9.7 | 18.2 | 5.5 | 8.7 | 6.5 | 8.4 | 6.0 | 10.5 |

*u/s—Ultrasonic Energy

The results in Table 3 indicate that the amine compound can be applied (dip or dip with simultaneous application of ultrasonic energy) at as low as ppm (0.000001%) concentration to the air corona treated HDPE and PP surfaces and that the adhesion enhancements are still remarkable compared with corona only treated samples. In particular, further substantially improved strengths can be obtained when the polyethyleneimine solutions are applied with simultaneous ultrasonic energy.

The comparison of results in Table 3 with those shown in Table 2 illustrates explicitly advantages of our invention versus that claimed in Japanese specification Sho 56-16175.

After curing of the adhesive, the strength of the bond was tested to compare the relative results of different surface treatments. The results of the tests are recorded in Table 4.

As can be seen from the Table 4, surface treatment of polyolefins with air corona, although achieved significant adhesion enhancement to the polyurethane adhesive, provided little or no bond strength to the cyanoacrylate adhesive. However, further enhancement in adhesion for the polyurethane adhesive and significant improvement of adhesion for the cyanoacrylate adhesive can be obtained with the 2-steps treatment process of this invention which consists of air corona followed by dipping in the low concentration of amine containing solutions whilst simultaneously applying ultrasonic energy.

TABLE 4

Lap shear strengths (MPa) of LDPE, HDPE, and PP bonded respectively to polyurethane, and cyanoacrylate adhesives

| Adhesive | Polymer | Corona level (mJ/mm$^2$) | Corona only | Corona + 0.1% Polyethylene- imine (u/s)* | Corona + 0.25% Diamino- propane (u/s)* | Corona + 0.25% hexamethylene diamine (u/s)* | Corona + 0.25% Penta- ethylene hexamine (u/s)* | Corona + 0.25% Poly (allyamine) (Mw = 8.5k–11k) (u/s)* | Corona + 0.25% Triamino- pyrimidine (u/s)* |
|---|---|---|---|---|---|---|---|---|---|
| Polyurethane (Tyrite 7520-A/B) | HDPE | 453 | 5.5 | 10.6 | — | 9.8 | 9.8 | — | — |
| | PP | 755 | 8.8 | 9.0 | — | 9.5 | 11.1 | — | — |
| Cyanoacrylate (Loctite 406) | LDPE | 453 | 2.8 | 8.9 | 5.7 | 6.9 | 6.2 | 7.1 | 6.3 |
| | HDPE | 755 | 1.5 | 15.4 | 13.4 | 14.4 | 16.3 | 13.5 | 12.4 |
| | PP | 755 | 0 | 15.5 | 10.1 | 13.2 | 14.9 | 13.5 | 5.6 |

*u/s—Ultrasonic energy (35 kHz, 30 s).

EXAMPLE 3

In this example the surface of samples of HDPE, LDPE and PP were treated by various methods and were bonded with a cyanoacrylate adhesive (Loctite 406) and a polyurethane adhesive (Tyrite 7520 A/B).

The various surface treatments were:

i) air corona discharge treatment only
ii) air corona discharge followed by dipping the substrate simultaneously with an ultrasonic energy (35 kHz) for 30 seconds in various amine compounds at the concentration of 0.1 to 0.25%.

EXAMPLE 4

In this example the surface of air corona treated polypropylene (PP), high density polyethylene (HDPE) and low density polyethylene (LDPE) were further immersed with the simultaneous application of ultrasonic energy for 30 seconds in a 0.25% 1,3-diamino-2-hydroxypropane or an 0.25% 2,4-diaminobutyric acid dihydro-chloride solution in isopropanol (as shown in Table 5). In the case of 2,4-diaminobutyric acid dihydrochloride, the pH of the solution has been adjusted prior to the surface treatment to the value of 7 using a 0.5M NaOH solution. The treated specimens were then bonded with a cyanoacrylate adhesive (Loctite 406).

TABLE 5

Lap shear strengths (MPa) of LDPE, HDPE, PP bonded to a cyanoacrylate adhesive.

| | | | Lap shear strength (MPa) | | |
|---|---|---|---|---|---|
| Adhesive | Polymer | Corona level (mJ/mm$^2$) | Corona | Corona + 0.25% 1,3-diamino-2-hydroxy-propane (u/s) | Corona + 0.25% 2,4-diaminobutyric acid dihydrochloride pH = 7 (u/s) |
| Cyano-acrylate (Loctite 406) | LDPE | 453 | 2.8 | 5.0 | 4.2 |
| | HDPE | 755 | 1.5 | 12.2 | 9.0 |
| | PP | 755 | 0 | 7.1 | 6.2 |

*u/s—Ultrasonic energy (35 kHz, 30 s)

In comparison with the strength obtained with air corona only, the results above also indicate further substantial adhesion enhancement as a result of surface treatment of the polyolefins in accordance with the present invention, i.e. air corona followed by the application of either of the two of the amine containing chemicals.

EXAMPLE 5

In this example the surface of low density polyethylene (LDPE), high density polyethylene (HDPE), and polypropylene (PP) were treated by air corona discharge only, or by air corona discharge followed by a 30 seconds dip in 0.25% pentaethylenmehexamine in isopropanol or 0.5% polyethyleneimine in isopropanol with simultaneous ultrasonic energy (35 kHz).

Following the above treatment, the specimens subsequently bonded with a cyanoacrylate adhesive (Loctite 406) were divided into two identical groups, one group of specimens were tested for bond strength after 72 hours curing of the adhesive (referred to as "dry strength") whilst the other group of specimens were first cured at room temperature for 72 hours in air and then being immersed for one month in water at a temperature of 60° C. (the strength thus obtained is referred to as "wet strength"). The results obtained are shown in the Table 6.

It can be seen from the table that in addition to the substantial strength improvement achieved when the amine compound is applied simultaneously with ultrasonic energy that this type of treatment also provides a very durable strong bond.

EXAMPLE 6

In this example, the surface of samples of polypropylene (PP) and PP-EPDM (ethylene propylene diene mixture) blend were treated by air corona at a level of 151 mJ/mm$^2$ followed by subsequent treatment with 0.25% polyethyleneimine or 0.25% triethylenetetramine in isopropanol. The treated samples were then painted respectively with two different metallic basecoats (Moonlight Silver, Silver 410—both from A.M Industries, Australia) followed by a two-part polyurethane clearcoat.

The paint adhesion was measured by determining pull-out strength of the paints from the polymer surface using an Elcometer. In operation, an aluminium dolly is bonded to the coating under test using a 2-pack 24 h curing epoxy adhesive. When cured, the Elcometer is placed over the dolly and the claws is engaged. The handwheel/ratcher spanner is slowly tightened. If the dolly and coating are removed from the substrate before the test pondage is reached. the dragging indicator retains the maximum pull-off force reached in MPa.

It can be seen from Table 7 that the application of a multi-functional amine compound after the air corona treatment on PP and PP-EPDM surfaces leads to significant enhancement of the paint adhesion to the tho types of metallic paints

TABLE 6

Dry and wet (one month exposure to 60° C. water) lap shear strengths of LDPE, HDPE, and PP bonded to a cyanoacrylate adhesive (Loctite 406).

| | | Lap shear strength (MPa) | | | | | |
|---|---|---|---|---|---|---|---|
| | | Corona only (755 mJ/mm$^2$) | | Corona + 0.25% Pentaethylene hexamine (u/s)* | | Corona + 0.25% Polyethyleneimine (u/s)* | |
| Adhesive | Polymer | Dry | Wet (1 month, 60° C.) | Dry | Wet (1 month, 60° C.) | Dry | Wet (1 month, 60° C.) |
| Cyanoacrylate (Loctite 406) | LDPE | 2.4 | 0 | 3.3 | 3.4 | 8.9 | 3.5 |
| | HDPE | 1.5 | 0 | 13.2 | 14.0 | 15.4 | 7.7 |
| | PP | 0 | 0 | 15.2 | 5.9 | 15.5 | 5.3 |

*u/s—Ultrasonic energy (35 kHz)

TABLE 7

Pull-out strength (MPa) of PP and PP-EPDM painted with Moonlight Silver and Silver 410 and the clearcoat

| Polymer | Treatment condition | Moonlight Silver | Silver 410 |
|---|---|---|---|
| PP | Untreated | 0.3 | 0.4 |
| | Corona + 0.25% Polyethyleneimine (brush on, rinse) | 1.0 | 1.6 |
| | Corona + 0.25% triethylenetetramine (brush on, rinse) | 1.0 | 1.4 |
| PP-EPDM | Untreated | 0.4 | 0.4 |
| | Corona + 0.25% Polyethyleneimine (brush on, rinse) | 1.1 | 1.3 |
| | Corona + 0.25% triethylenetetramine (brush on, rinse) | 1.5 | 2.5 |

(ii) Oxidative treatment by air corona at a level of 151 mJ/mm$^2$ followed by dipping in the following alternative aqueous solutions for 5 minutes under agitation: a 0.2% aminodextran solution, a 0.5% pentaethylenehexamine solution, a 0.5% polyethyleneimine solution and a 0.5% polyallyamine (Mn=8,000–11,000) solution. The above treated surfaces were well cleaned by the following procedure (a): 2 cycles of cleaning with each cycle consisting of three time thorough rinse with distilled water, followed 5 by 5 minutes ultrasonic cleaning in distilled water, and a final rinse again with distilled water. The samples were then dried by air blowing and subsequently standing in ambient air for one hour before contact angle and wettability measurements.

The results of the tests are recorded in Table 8.

TABLE 8

Air/water contact angle (°) and wettability of PP, HDPE, PS and PET treated by various methods

| | PP | | HDPE | | PS | | PET | |
|---|---|---|---|---|---|---|---|---|
| Samples | Contact angle (°) | Wettability | Contact angle (°) | Wettability | Contact angle (°) | Wettability | Contact angle (°) | Wettability |
| Air corona (151 mJ/mm$^2$) | 81.5 ± 1.5 | Very poor | 60.0 ± 1.0 | Poor | 40.0 ± 1.0 | Good | 51.0 ± 2.0 | Poor |
| Air corona (151 mJ/mm$^2$) + 0.2% Aminodextran | 53.5 ± 2.0 | Good | 21.0 ± 1.0 | Good | 10.0 ± 2.0 | Good | 9.0 ± 2.0 | Good |
| Air corona (151 mJ/mm$^2$) + 0.5% Pentaethylenehexamine | — | — | — | — | — | — | 42.5 ± 1.5 | Moderate |
| Air corona (151 mJ/mm$^2$) + 0.5% Polyethyleneimine | 65.5 ± 2.0 | Moderate | 42.5 ± 1.0 | Good | 15.0 ± 2.0 | Good | 21.5 ± 1.0 | Good |
| Air corona (151 mJ/mm$^2$) + 0.5% Polyallyamine | 66.0 ± 2.0 | Moderate | 47.0 ± 2.0 | Moderate | — | — | 38.0 ± 1.0 | Good |

EXAMPLE 7

In this example the surfaces of poly(ethylene terephthalate) (PET) film, high density polyethylene (HDPE), polypropylene (PP) and polystyrene (PS) were treated by various methods before air/water contact angle and wettability measurements.

The various surface treatments were:

(i) Oxidative treatment by air corona at a level of 151 mJ/mm$^2$. The air corona treated sample was cleaned by distilled water in accordance with the procedure (a) described below, and was used as a control specimen.

EXAMPLE 8

In this example, polyester and 70%PVDF/30%acrylic coated mild steel and polypropylene (PP) substrates were surface treated by the following methods:

(i) Oxidative treatment by flame (air/propane ratio=1.0%, treatment speed=15m/min, treatment distance=10 mm, 1 single treatment). The Flame treated sample was cleaned by distilled water applying the procedure (a) described in Example 1 and was used as a control.

(ii) Oxidative treatment by flame as described in (i) above, followed by dipping in a 0.2% aminodextran aqueous solution for 5 minutes under agitation. The above treated surfaces were well cleaned by the procedure (a) as described in Example 7. The samples were then dried by air blowing and subsequently standing in air for one hour before contact angle and wettability measurements.

The results are illustrated in Table 9.

TABLE 9

Air/water contact angle and wettability of PP, and polyester or 70% PVDF/30% acrylic coated mild steel substrates treated by various methods

| Sample | | PP | Dark brown (Polyester) | Pink (Polyester) | Beige (Polyester) | Fluorinated (70% PVDF/ 30% acrylic) |
|---|---|---|---|---|---|---|
| Flame treated | Contact angle (°) | 73.5 ± 2.5 | 63.0 ± 2.0 | 65.0 ± 2.0 | 59.0 ± 2.0 | 50 ± 2.0 |
| | Wettability | Very poor | Very poor | Very poor | Very poor | Very poor |
| Flame + 0.2% amino dextran | Contact angle (°) | 39.0 ± 2.0 | 20.0 ± 2.0 | 30.0 ± 2.0 | 27.0 ± 2.0 | 31.0 ± 1.0 |
| | Wettability | Good | Good | Good | Good | Good |

EXAMPLE 9

In this example, HDPE, PTFE, and FEP were treated by helium corona (Helium flow rate=4 liters/min, 151 mJ/mm$^2$). The corona treated HDPE, PTFE, and FEP were subsequently immersed in a 0.5% aqueous solution of aminodextran for 20 hours. The treated samples were either cleaned by the procedure (a) as described previously in Example 8, or by the combination of the procedure (a) and a following procedure (b) which involves autoclaving the samples at 121° C. for 15 minutes. The cleaned samples were dried by air blowing and storing in a clean culture dish in a fume hood for one day before air/water contact angle and wettability measurements. The results of experiments are summarised in Table 10.

TABLE 10

Air/water contact angle (°) and wettability of HDPE and FEP surface treated by various methods

| | Cleaned by procedure (a) | | Cleaned by procedure (a) + (b) | |
|---|---|---|---|---|
| Sample | Contact angle (°) | Wettability | Contact angle (°) | Wettability |
| HDPE | 11.0 ± 1.0 | Good | 10.0 ± 1.0 | Good |
| PTFE | 36.0 ± 2.0 | Good | — | — |
| FEP | 17.5 ± 1.0 | Good | 35.5 ± 1.5 | Moderate |

EXAMPLE 10

In this example, HDPE and PET were oxidised by air corona (151 mJ/mm$^2$), whilst PP was either oxidised by air corona (151 mJ/mm$^2$) or by flame treatment (air/propane ratio=1.0%, treatment speed=15 m/min, treatment distance= 10 mm, 1 single treatment). The oxidised polymers were then submitted to the following two post-treatments respectively:
(i) immersed in a 0.5% aqueous solution of polyallyamine (Mn=8,000–11,000) for 5 minutes, followed by cleaning of the treated surface by the procedure (a);
(ii) immersed in a 0.5% aqueous solution of polyallyamine (Mn=8,000–11,000) or polyethylene imine (Mn=25000) for 5 minutes, followed by cleaning of the treated surface by the procedure (a). Such treated and cleaned surface was further immersed respectively in following solutions: a 0.5% aqueous solution of polyacrylic acid (Mn=25,000), a 0.2% dextran sulfate, a 0.2% carboxylic dextran for 5 minutes. The treated sample was rinsed again following the procedure (a). In the case of HDPE and PP, the samples were dried by air blowing and storing in a clean culture dish in a fume hood for one hour before contact angle and wettability assessments. But in case of PET, the treated specimens were stored in air for two days prior to contact angle and wettability measurements.

The results are listed in Table 11.

TABLE 11

Air/water contact angle and wettability of HDPE, PP and PET surface treated by different methods

| Treatment | Measurements | HDPE | PET* | PP |
|---|---|---|---|---|
| Corona + 0.5% polyallyamine | Contact angle (°) | 48.0 ± 1.5 | 63.0 ± 2.0 | 66.0 ± 1.5 |
| | Wettability | Moderate | Poor | Moderate |
| Corona + 0.5% polyallyamine + 0.5% polyacrylic acid | Contact angle (°) | 36.0 ± 1.0 | 42.5+ 1.5 | 40.0 ± 1.0 |
| | Wettability | Good | Moderate | Good |
| Corona + 0.5% polyallyamine + 0.2% dextransulfate | Contact angle (°) | — | — | 30.0 ± 1.5 |
| | Wettability | — | — | Good |
| Corona + 0.5% polyallyamine + 0.2% carboxylic dextran | Contact angle (°) | 21.0 ± 1.0 | — | 21.0 ± 1.0 |
| | Wettability | Good | — | Good |
| Corona + 0.5% polyethyleneimine + 0.5% polyacrylic acid | Contact angle (°) | — | — | 36.0+ 1.5 |
| | Wettability | — | — | Good |
| Flame + 0.5% polyallyamine | Contact angle (°) | — | — | 69.0 ± 1.5 |
| | Wettability | — | — | Poor |
| Flame + 0.5% polyallyamine + 0.5% polyacrylic acid | Contact angle (°) | — | — | 37.5 ± 1.0 |
| | Wettability | — | — | Good |

*The surface treated PET samples were stored in air for two days prior to contact angle and wettability assessments.

EXAMPLE 11

In this example, PP sheets were oxidised by air corona (151 mJ/mm$^2$). The oxidised PP sheets were then immersed in the following solutions for 5 mins:
(1) 0.2% polyacrylic acid (Mn=2000) aqueous solution;
(2) 0.2% premixed polyethylene imine (Mn=25000) and polyacrylic acid (Mn=2000) aqueous solution (amine/ carboxyl ratio=3);
(3) 0.2% premixed polyallyamine (Mn=60000–65000) and carboxylic dextran aqueous solution (amine/ carboxyl ratio=40).

The above treated samples were then rinsed by distilled water for 10 times, followed by rinsing in an ultrasonic bath in water for 5 mins and final rinses with water for 5 times. The sample were dried for overnight before water contact angle and wettability measurements.

The results are illustrated in Table 12.

TABLE 12

Air/water contact angle and wettability of PP surfaces treated by oxidation, followed by post-chemical graftings using either a single acidic containing compound or a combination of multi-functional amine containing compound and acidic group(s) containing compound

| Sample | water contact angle (°) | Wettability |
| --- | --- | --- |
| Polyacrylic acid | 74.0 ± 1.5 | Poor |
| Polyethyleneimine + Polyacrylic acid | 25.0 ± 1.0 | Good |
| Polyallyamine + Carboxylic Dextran | 43.0 ± 1.5 | Good |

The results in Table 12 confirm that an hydrophobic surface such as that of polypropylene can be effectively transformed into an hydrophilic and wettable one when the concept of multi-layer grafting was applied as shown in the treatments (2) and (3) above. Direct application of a polyacrylic acid polymer onto the oxidised PP surface failed to increase the hydrophilicity and the wettability of the PP surface.

EXAMPLE 12

In this example, woven fabrics of ultra-high modulus polyethylene (UHMPE) fibre and aramid fibre were treated by air corona (151 mJ/mm$^2$) followed by a 30 seconds dip in 0.25% triethylene tetramine (TETA) in isopropanol with simultaneous application of ultrasonic energy (35 kHz).

Following the above treatment, laminated specimens of UHMPE fibre/epoxy (Araldite 138) and Aramid fibre/Maleated LDPE (BF1000)(lamination condition: 180° C., 1 MPa, 10 minutes) were prepared and divided into two identical groups, one group of specimens were tested for peel strength after lamination and completion of the curing of the matrix (referred to as "dry strength") whilst the other group of specimens were first cured at room temperature for 72 hours in air as required in the case of UHMPE/epoxy laminates. Then both groups of composite laminates were immersed for one month in water at a temperature of 60° C. (the strength thus obtained is referred to as "wet strength"). The results obtained are shown in Table 13.

TABLE 13

Dry and wet peel strengths of composite laminates of UHMPE/epoxy (Araldite 138) and Aramid/Maleated LDPE

| | Peel strength (J/m$^2$) | | | |
| --- | --- | --- | --- | --- |
| | UHMPE/Araldite 138 | | Aramid/Maleated LDPE | |
| Treatment | Dry | Wet (1 month, 60° C.) | Dry | Wet (1 month, 60° C.) |
| Untreated | 1163 | 760 | 1755 | 1096 |
| Air corona + 0.25% TETA | 1750 | 1442 | 2278 | 2040 |

The above results indicate that the composite laminates containing the fibres treated by one of the preferred embodiments of the present invention which was surface oxidation by air corona discharge and subsequent grafting of a multi-functional amine containing compound such as TETA exhibited significantly superior performance in both dry and wet environments in comparison with the composite laminates containing only untreated fibres.

EXAMPLE 13

In this example, polystyrene culture dishes were first oxidised by corona discharge according to the following treatment condition: corona discharge power 112 W treatment speed 0.17 m/min. treatment distance: 2.5 mm, 1 single pass treatment. The oxidised culture dishes were then immersed in 0.25% triethylene tetramine in isopropanol for 30 sec, followed by final rinses of the treated surface by distilled water and ethanol before drying and the subsequent cell growth.

TABLE 14

Observation on the cell growth on both CSIRO treated culture dishes and Nunc Dishes, and final cell counts

| Incubation time (h) | Cell line | Observation |
| --- | --- | --- |
| 4 h | Lim2099 | Attachment in both culture dishes appears equivalent |
| | Immorto.Colon | Adherence slightly better in CSIRO treated culture dishes |
| 2 days | Lim2099&Immorto.Colon | Adherence of both cell types similar in both types of culture dishes |
| 3 days | Lim2099&Immorto.Colon | As above |
| 4 days | Lim2099&Immorto.Colon | Growths appear equivalent |
| 7 days | Lim2099&Immorto.Colon | Growths appears equivalent |
| | Final cell counts: | |
| Lim2099 | CSIRO | 3.15 × 10$^5$ cells |
| | Nunc | 3.5 × 10$^5$ cells |
| Immorto.Colon | CSIRO | 5.4 × 10$^5$ cells |
| | Nunc | 5.65 × 10$^5$ cells |

The above treated polystyrene culture dishes were tested for cell adhesion and spreading using two cell lines. Nunc treated polystyrene culture dishes, which are commercially available products, were used for comparation. Two cell lines, LIM2099, a human colon carcinoma cell line and immortomouse colon, a recently established mouse colonic epithelial cell line, were trypsinised and the resultant cell suspensions counted and adjusted to a cell concentration of 10$^5$ per ml in tissue culture medium (RPMI 1640 plus 5% foetal calf serum and 1 ug/ml insulin). The culture dishes were incubated at the appropriate temperature for each cell line. After 7 days incubation, the cells in each type of culture dishes were removed using trypsin and collected in 5ml of medium. The total cell number in each dish was determined by counting using a haemocytometer. Trypsinisation times were similar with each plate type. Summary of the observation and results are indicated in Table 14.

It is apparent from the above result that the CSIRO treated culture dishes are at least as suitable as the commercially available Nunc culture dishes for cell growth.

Finally, it is to be understood that various other modifications and/or alterations may be made without departing from the spirit of the present invention as outlined herein.

We claim:

1. A method of modifying at least a part of the surface of a polymer including:
   (i) oxidising at least part of the surface of the polymer; and
   (ii) treating the oxidised surface with at least one multi-functional amine-containing organic compound to bind said compound to the oxidised polymer surface wherein the multifunctional amine-containing organic compound consists of the elements carbon, hydrogen and nitrogen and optionally comprises one or more elements selected from the group consisting of oxygen, sulphur, halogen and phosphorous and comprises at least one amine functional group which is not a nitrogen heterocyclic group and at least one further functional group which may be an amine or other functional group.

2. A method according to claim 1 wherein when the multifunctional amine containing compound is applied as a solution of concentration greater than 0.5% by weight, the treated polymer surface is washed to remove excess multifunctional amine-containing organic compound.

3. A method according to claim 1 wherein the multifunctional amine-containing organic compound is in the form of a solution and has a concentration of from 0.000001 to less than 1% by weight.

4. A method according to claim 1 wherein the multifunctional amine-containing organic compound is applied to the oxidised polymer surface in admixture with at least one acidic group containing compound and the ratio of amine to acidic group is greater than 1.

5. A method according to claim 1 wherein following treatment with the multifunctional amine-containing organic compound the process further includes reacting the treated surface with at least one acidic group containing compound to bind the acidic group containing compound onto the polymer surface through reaction with the bonded multifunctional amine containing organic compound.

6. A method according to claim 5 wherein the acidic group(s) containing compound is applied to the treated surface as a solution of concentration in the range of from 0.000001 to 10% by weight and when the concentration is 0.5% by weight or more excess acidic group(s) containing compound is washed from the treated polymer surface.

7. A method according to claim 1 or claim 5 wherein the multifunctional amine-containing organic compound is and optionally also said acidic group containing compound is applied from solution vapour or any type of mechanical, dispersion of a pure chemical or their solutions and/or mixtures in any suitable solvent.

8. A method according to claim 1 wherein the multifunctional amine-containing organic compound is applied from a solution of water, alcohol or a mixture of thereof and the surface of the treated polymer is washed with an alcohol, water or a mixture thereof.

9. A method according to claim 1 or claim 5 wherein the oxidising of the polymer surface is carried out by a process selected from the group consisting of corona discharge, flame treatment, non-depositing plasma, UV irradiation, oxidizing gases or mixture of thereof, chromic acid oxidation or a combination of two or more thereof.

10. A method according to claim 1 or claim 5 wherein the at least one amine functional group which is not heterocyclic is a primary or secondary amine functional group.

11. A method according to claim 1 wherein the multifunctional amine containing compound is selected from the group consisting of: $C_2$ to $C_{36}$ linear, branched or cyclic compounds containing two or more amine groups; polymers of a number average molecular weight of from 300 to 3 million containing a multiplicity of amine groups; $C_2$ to $C_{36}$ perfluoroamines; $C_2$ to $C_{36}$ amino alcohols/phenols; $C_2$ to $C_{36}$ amino acids; $C_2$ to $C_{36}$ amino aldehydes/ketones; $C_2$ to $C_{36}$ amino amides; $C_2$ to $C_{36}$ amino ethers; $C_2$ to $C_{36}$ amino esters; $C_2$ to $C_{36}$ amino nitros; $C_2$ to $C_{36}$ amino nitriles; $C_2$ to $C_{36}$ amino thiols; $C_2$ to $C_{36}$ amino phosphoric acids; and $C_2$ to $C_{36}$ amino sulfonic acids; $C_2$ to $C_{36}$ amino halogens; $C_2$ to $C_{36}$ amino alkenes; $C_2$ to $C_{36}$ amino alkynes; polymers of a number average molecular weight of from 300 to 3 million containing a multiplicity of amine groups and non-amine functional groups; and amino polysaccharides.

12. A method according to claim 1 wherein the oxidised surface is treated with at least one multifunctional amine-containing organic compound for a period of 0.0001 to 30 seconds at a temperature in the range from 20° C. up to or above the boiling point of the compound.

13. A method according to claim 4 or claim 5 wherein the acid group containing compound is selected from carboxylic/carboxylate containing compounds, and/or phosphoric/phosphonate containing compounds and/or sulfonic/sulphonate containing compounds and optionally containing more than one type of acidic group and optionally other organic functional groups selected from the group consisting of hydroxyl, amine, amide, ether, ester, ketone, aldehyde and halogen.

14. A method according to claim 13 wherein the acid group containing compound is selected from the group consisting of: polymers of monomers selected from the group consisting of acrylic acid, methacrylic acid, p-styrene carboxylic acid, 4-methacryloyloxyehtyl trimellitate, vinyl sulphonic acid, p-styrene sulfonic acid, melaphosphonic acid; and copolymers including one or more thereof; and polysaccharide derivatives containing sulfonic/sulphonate and carboxylic/carboxylate groups.

15. A method according to claim 1 or claim 5 wherein a static or high frequency alternating physical field is applied to the polymer surface or multifunctional amine containing organic compound during treatment of the oxidised polymer surface with the multifunctional amine-containing organic compound.

16. A method according to claim 15 wherein an ultrasonic energy field of from 1 to 500 kHz is applied and/or microwave energy is applied in the range of from 1 GHz to 300 GHz.

17. A method for improving adhesive bonding of a polymer surface with a substrate comprising the steps of:
   modifying at least part of the polymer surface according to the method of claim 1 or claim 5; and
   bonding the polymer surface to the substrate by contacting the modified polymer surface with an adhesive.

18. A method of improving coating adhesion to a polymer surface comprising the steps of:
   modifying at least part of the polymer surface according to the method of claim 1 or claim 5; and
   coating the modified polymer surface with an organic, non-organic or metallic coating, or paint or lacquer which may be cured thereon.

19. The method of claim 1 or claim 5 wherein the polymer surface is hydrophobic and is modified by said method to increase surface wettability and provide a water contact angle of less than 60°.

20. The method of claim 1 or claim 5
   wherein the polymer surface is hydrophilic and is modified, providing a non-wettable surface of water contact angle equal or greater than 90°.

21. A method for providing a wettable polymer-coated metallic or ceramic product comprising the steps of:
   coating the metallic or ceramic product with a hydrophobic polymer coating; and
   modifying the free surface of the polymer coating according to the method of claim 1 or claim 5 to provide a wettable surface and a water contact angle of no more than 60°.

22. A method according to claim 21 wherein the coated metallic or ceramic product includes steel or aluminium or ceramic sheet coated with polyester and or vinylidene fluoride coating.

23. A method for the manufacture of medical products having polymer surfaces to be used in contact with human tissue or body fluids the method comprising the steps of modifying at least part of the polymer surfaces to be used in contact with human tissue or body fluids by the method of claim 1 or claim 5 to render the surfaces biocompatible.

24. A method for the manufacture of a biomedical assay apparatus comprising a polymeric assay surface said method comprising the steps of preparing the apparatus and subjecting the polymeric assay surface of the apparatus to the method of claim 1 or claim 5 and optionally reacting biological agents selected from the group consisting of proteins, enzymes, antibodies and analytes therewith to immobilise said reagent on the treated polymer surface.

25. A method of printing comprising the steps of:

providing a polymer printing substrate, modifying a free surface of the polymer printing substrate according to the method of claim 1 or claim 5, and applying printing ink to the modified surface.

* * * * *